United States Patent [19]

Kayser et al.

[11] Patent Number: 4,536,300

[45] Date of Patent: Aug. 20, 1985

[54] MICELLAR SOLUTION FOR RECOVERING CRUDE OIL

[75] Inventors: Robert B. Kayser, Evergreen, Colo.; Robert F. Purcell, Roselle, Ill.

[73] Assignee: Angus Chemical Company, Northbrook, Ill.

[21] Appl. No.: 555,284

[22] Filed: Nov. 25, 1983

Related U.S. Application Data

[63] Continuation-in-part of Ser. No. 284,766, Jul. 20, 1981, abandoned.

[51] Int. Cl.³ .............................................. E21B 43/22
[52] U.S. Cl. .................................. 252/8.55 D; 166/275
[58] Field of Search ..................... 252/8.55 R, 8.55 D; 548/239

[56] References Cited

U.S. PATENT DOCUMENTS

| | | | |
|---|---|---|---|
| 2,416,552 | 2/1947 | Valko | 548/239 |
| 3,336,145 | 8/1967 | Purcell | 106/176 |
| 3,493,048 | 2/1970 | Jones | 166/252 |
| 3,506,070 | 4/1970 | Jones | 166/273 |
| 3,508,611 | 4/1970 | Davis et al. | 252/8.55 X |

OTHER PUBLICATIONS

Gogarty et al., "Miscible Type Waterflooding: Oil Recovery with Micellar Solutions", *J. Pet Tech.*, pp. 1407–1414.
Technical Data Sheets 4A and 4B: IMC Chemical Group Inc. (International Minerals & Chemical Corporation).

*Primary Examiner*—Herbert B. Guynn
*Attorney, Agent, or Firm*—Robert H. Dewey

[57] ABSTRACT

An improved process for recovering crude oil from a geological formation containing it using a micellar solution containing as a surfactant a salt of a petroleum sulfonic acid having an equivalent weight of from about 350–500 and as a co-surfactant 2-alkenyl-4,4-substituted oxazoline.

7 Claims, No Drawings

MICELLAR SOLUTION FOR RECOVERING CRUDE OIL

CROSS-REFERENCE TO RELATED APPLICATIONS

This application is a continuation-in-part of copending U.S. application Ser. No. 284,766, filed July 20, 1981, now abandoned.

BACKGROUND OF THE INVENTION

This invention relates to a process for recovery of crude oil from a geological formation containing it. In a particular aspect, this invention relates to recovery of crude oil by the micellar-flood process.

The yield of crude oil from a geological formation is usually far from the total crude oil present because once the pressure on the formation is relieved, there is no easy method for recovering the residual oil.

It is known to improve recovery of residual crude oil from a geological formation containing it by the process of water-flooding. In this process, one or more wells spaced from the production well are drilled and water under pressure is pumped through these auxiliary wells into the surrounding formation. The advancing water front sweeps residual oil before it to the production well where both water and oil are recovered. However, considerable petroleum is left behind in the formation and there have been numerous attempts to improve its recovery.

A variety of processes have been proposed to improve this recovery. One of these, as proposed by Gogarty et al, U.S. Pat. No. 3,254,714, which is incorporated herein by reference thereto employs injection of micellar solutions (also known as micro-emulsions, swollen micells and soluble oils). Basically these solutions are water-in-oil type emulsions composed of a surfactant, a hydrocarbon and water and may also contain small amounts of electrolytes and cosurfactants. Oil-in-water emulsions have also been used. These solutions are stable in the presence of reservoir water and rock and can be driven through the reservoir with water. They displace most if not all of the oil contacted, but due to channeling, some portions of the formation may be by-passed. The process can be used in either secondary or tertiary recovery operations.

According to Gogarty et al, "Miscible-Type Waterflooding: Oil Recovery with Micellar Solutions", J. Pet. Tech., 1407–1414, December 1968, the process is operated as follows. A slug of a micellar solution is injected to serve as the oil-displacing agent. Then a mobility buffer is injected to protect the slug from water invasion and finally drive water is injected to push the slug and mobility buffer through the reservoir. The mobility buffer is either a water-external emulsion or water thickened with a polymer. As the slug moves through the reservoir, the residual crude oil is displaced from the reservoir and dissolves in the hydrocarbon phase of the micellar solution. The mixture is recovered at the producing well.

As previously mentioned, micellar solutions consist primarily of three components, i.e. hydrocarbon, surfactant and water, and optionally electrolytes and co-surfactants. The hydrocarbon can range from liquified petroleum gas through various refinery streams to crude oil. Sodium salts of petroleum sulfonic acids are effective and widely used surfactants but other types are also used.

Lower alkyl alcohols are often added as co-surfactants. They increase the latitude in composition through which micellar solutions can be made. Electrolytes allow additional control in attaining the proper viscosity required for mobility control, i.e. control of the movement of the slug through the reservoir.

Gogarty et al, J. Pet. Tech., op. cit., list the compositions of six typical micellar solutions, which can be summarized as follows:

| Petroleum sulfonate | 8.6–14.3% | by volume |
|---|---|---|
| Isopropyl alcohol | 0.6–4.3 | |
| Water | 11.7–40.0 | |
| Hydrocarbon | 45.6–73.4 | |
| Sodium sulfate | 0–0.2* | |

*Wt % based on water.

SUMMARY OF THE INVENTION

It is an object of this invention to provide an improved process for recovery of crude oil from a geological formation containing it.

It is another object of this invention to provide an improvement in the process for recovery of crude oil by the water flooding process.

Other objects of this invention will be apparent to those skilled in the art from the disclosure herein.

It is the discovery of this invention to provide an improvement in the recovery of crude oil from a geological formation by the water-flooding process using micellar solutions. The improvement comprises using in the micellar solution a combination of a low-equivalent weight petroleum sulfonate salt as the principal surfactant, an electrolyte and, as a co-surfactant, a substituted 2-oxazoline represented by the formula

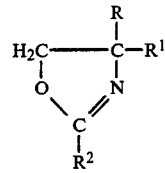

where R can be ethyl or hydroxymethyl and $R^1$ is hydroxymethyl. $R^2$ is long chain alkenyl of from 15–19 carbon atoms.

DETAILED DISCUSSION

The oxazolines useful in the practice of this invention are known in the art and are described by R. F. Purcell in U.S. Pat. No. 3,336,145, which is incorporated herein by reference thereto. These oxazolines are commercially available and the commercial products are suitable for the practice of this invention. For example, $R^2$ is a long chain alkenyl group from oleic acid. Thus, $R^2$ is principally heptadecenyl, but because oleic acid is composed of fatty acids as well as octadecenyl, the oxazolines are actually mixtures of related oxazolines. Therefore, it is not intended that the practice of this invention be limited to $R^2$ as heptadecenyl. When R is ethyl, the oxazoline is sold commercially under the trademark ALKATERGE-E and when R is hydroxymethyl, it is sold as ALKATERGE-T. Both compounds are available from Angus Chemical Company, Northbrook, Ill.

The petroleum sulfonates used in the practice of this invention are known in the art. They are of low equivalent weight, e.g. from about 350 to about 500, preferably 390-460. Commercial sulfonates are usually mixtures of compounds. In general, they can be described as mono-, di- or trisubstituted benzene sulfonic acids where the substituents are alkyl or cycloalkyl of varying chain length. They are used principally as the sodium salt, although it has also been suggested to use ammonium or alkanolamine salts.

Oxazolines function best in the presence of an electrolyte such as sodium chloride, sodium sulfate, etc. This is highly desirable since many reservoir waters have a high salt content. The amount of salt present in the formulation of micellar slugs may vary somewhat depending on the particular oxazoline, the petroleum sulfonate and the characteristics of the crude oil. However, in general the electrolyte content should be about 600-650 ppm NaCl for forming the slug where the reservoir waters are of from 10,000 ppm or higher. In reservoirs of low salt content, higher amounts of salt can be incorporated in the slug.

The amount of petroleum sulfonate used is not critical as it will vary somewhat according to the particular product selected and with the characteristics of the crude oil. Generally, however, from 7-14% as the sodium salt, 100% active basis, will be suitable. Typical petroleum sulfonates include Petrostep 420 and Petrostep 450 marketed by Stepan Chemical Corporation, Northfield, Ill., and Conoco C-550 (a sodium dodecyl benzene sulfonate) marketed by Conoco Oil Company.

In the practice of this invention, the micro-emulsion water-flooding process (many variations of which are known) is carried out in accordance with the prior art except that generally from 0.4 to 2.4% by weight of oxazoline is dissolved in the micellar slug emulsion. Preferably the oxazoline is dissolved in the petroleum sulfonate, then the hydrocarbon component, if any, is added. Finally, the water-salt component is added. Oxazolines are highly soluble in hydrocarbons but insoluble in water, yet they lower the interfacial tension between oil and water to an extraordinary degree.

The oxazolines used in the practice of this invention may be the only co-surfactant used, or they may be used in conjunction with other co-surfactants known in the art. They are compatible with alcohols, which are also sometimes used as co-surfactants, and they are stable in alkaline solution. However, they hydrolyze in the presence of strong acids.

The invention will be better understood with reference to the following examples. It is understood, however, that these examples are intended only to illustrate the invention. It is not intended that the invention be limited thereby.

EXAMPLE 1

A laboratory experiment is carried out following in all essential details the procedure of R. N. Healy et al, Soc. Pet. Eng. J. 87-100, February 1975, except that the micellar solutions have the following compositions:

|  | A | B |
|---|---|---|
| Petroleum sulfonate | 11.4 | 11.4 |
| Isopropyl alcohol | 3.0 | 2.5 |
| Water | 40.0 | 40.0 |
| Kerosene | 45.6 | 45.6 |
| ALKATERGE-E | 0 | 0.5 |

Oil recovery using solution B is significantly improved over that using solution A.

EXAMPLE 2

The experiment of Example 1 is repeated in all essential details except that ALKATERGE-T is substituted for ALKATERGE-E. Oil recovery using the oxazoline is significantly greater than without it.

EXAMPLE 3

Micellar emulsion slugs were prepared from an oxazoline, a low molecular weight petroleum sulfonate, a crude oil and carbonate and bicarbonate-free water containing 625 ppm $NaCl_3$ (produced water).

The oxazoline used was 4-ethyl-4-hydroxymethyl-2-alkenyl oxazoline. The alkenyl group derived from oleic acid used for preparing the oxazoline. This compound is sold under the trademark ALKATERGE-E by Angus Chemical Company, Northbrook, Ill.

The petroleum sulfonates used were Petrostep 420 having a mean equivalent weight of 420, Petrostep 450 having a mean equivalent of 450, sold by Stepan Chemical Company, Brookfield, Ill., and Conoco C-550 (sodium dodecylbenzene sulfonate, equivalent weight 348) sold by Conoco Oil Company.

The crude oil samples were a sample of Pennsylvania paraffinic (PNA), a sample of Illinois naphthenic (SLC) and a blend (ACS).

To prepare the slugs, the oxazoline was dissolved in the petroleum sulfonate and "produced" water was then added with agitation. These slugs were rated for stability (stab.) and viscosity (visc.), then tested against crude oil and additional water of varying concentrations of salinity to determine phase behavior. The results are summarized in Table 1. The rating system was as follows:

— unstable, phase separates immediately
H hazy coating and hazy appearance, unstable slug
1 uneven coating of glass, heterogeneous almost hazy appearance with excessive swirling
2 uneven coating of glass, heterogeneous appearance with excessive swirling
3 smooth and even coating of glass, slightly heterogeneous appearance with swirling
4 smooth and even coating of glass, translucent homogeneous appearance with slight swirling
5 smooth and even coating of glass, translucent homogeneous appearance with no swirling Slugs rated unstable "—", H, 1 or 2 are slugs in which the micellar system does not have adequate phase characteristics to use in micellar-polymer flooding.

TABLE 1

| Slug No. | 2520 | 2520-A | 2522 |
|---|---|---|---|
| Petrostep* | 420 | 420 | 450 |
| Conc.** g/100 g | 12.2 | 14.8 | 11.4 |
| Wt % Active** | 7.0 | 8.8 | 7.0 |
| Water, g/100 g | 87.8 | 85.2 | 88.6 |

Conc. Oxazoline

TABLE 1-continued

| g/100 g | Stability | Viscosity | Stability | Viscosity | Stability | Viscosity |
|---|---|---|---|---|---|---|
| 0.0 | 5 | 1.6 cps | 2 | 2.3 | 4 | 3.3 |
| 0.4 | 5 | 2.0 | 4 | 3.5 | 5 | 10.3 |
| 0.8 | 4 | 3.0 | 3 | 4.5 | 4 | 24.3 |
| 1.2 | 3 | 7.4 | 3 | 7.9 | 3 | 67.6 |
| 1.6 | 3 | 21.4 | 3 | 15.8 | 3 | 134 |
| 2.0 | 2 | 33.3 | 3 | 30.4 | 3 | 154 |
| 2.4 | 2 | 78.0 | 4 | 15.4 | 4 | 713 |
| 2.8 | 1 | 192 | — | — | 4 | 670 |

*Extracted
**Of Petrostep

From the above data, it can be seen that from about 0.4 to about 1.6 g/100 g of oxazoline with 7% of petroleum sulfonate Petrostep 420 yields useful slugs but with 8.8%, the range is extended to from 0.4 to about 2.4 or more.

Slugs 2520-A and 2522 were selected for further testing for forming micellar solutions. These phase-stable blends were mixed with three different crude oil samples and "produced" water (water of predetermined dissolved solids) at various levels of total dissolved solids (TDS). The test mixtures were prepared by mixing 21 ml of crude oil (described above), 21 ml of produced water and 8 ml of the stable slug which had a viscosity of approximately 20 cps (i.e. at about 1.6 g/100 g for 2520-A and 0.8 with 2522). The phase behavior was observed and interfacial tension measurements between the oil and water phase were made. The desired phase behavior was of two types: (a) the sulfonate forms a middle phase between oil and water; this middle phase is an emulsion composed of oil and sulfonate, or oil-water-sulfonate (slug interacts with oil); (b) the sulfonate is in the oil phase usually with some water (again, slug interacts with oil). The results were as follows:

2520-A Slugs

With ACS blend, type (a) behavior was observed with water containing 25,413 ppm NaCl, and type (b) behavior was observed at 50,826 ppm.

With PNA crude, type (a) behavior was observed at 50,826 ppm NaCl.

With SLC crude, type (b) behavior was observed at 50,826 ppm.

2522 Slugs

With ACS crude, type (b) behavior was observed at 15,250 ppm NaCl and as high as 50,826.

With PNA crude, type (a) behavior was observed over the same range.

With SLC crude, type (a) behavior was observed at 15,240 ppm and type (b) behavior was observed at 25,413 and 50,286 ppm.

EXAMPLE 4

The experiment of Example 3 was repeated in all essential details using ALKATERGE-T instead of ALKATERGE-E. The stability (stab.) and viscosity (visc.) of slugs of various oxazoline contents were as follows:

TABLE 2

| Slug No. | 2521 | | 2521-A | | 2523 | | 2526-A | |
|---|---|---|---|---|---|---|---|---|
| Surfactant | Petrostep 420* | | Petrostep 420* | | Petrostep 450* | | Conco C-550 | |
| Conc.** g/100 g | 12.2 | | 14.8 | | 11.4 | | 26.0 | |
| Wt % Active | 7.0 | | 8.8 | | 7.0 | | 13.0 | |
| Water, g/100 g | 87.8 | | 85.2 | | 88.6 | | 74.0 | |
| Conc. Oxazoline g/100 g | Stab. | Visc. | Stab. | Visc. | Stab. | Visc. | Stab. | Visc. |
| 0.0 | 5 | 1.6 cps | 5 | 2.3 | 4 | 3.3 | 5 | 4.7 |
| 0.4 | 5 | 1.9 | 3 | 2.9 | 4 | 6.1 | 5 | 5.8 |
| 0.8 | 4 | 3.0 | 2 | 4.5 | 3 | 12.5 | 5 | 6.9 |
| 1.2 | 4 | 4.9 | 3 | 8.0 | 3 | 23.0 | 5 | 7.9 |
| 1.6 | 3 | 7.6 | 3 | 11.0 | 3 | 23.1 | 5 | 9.0 |
| 2.0 | 2 | 13.0 | 4 | 15.0 | 2 | 57.1 | 5 | 11.7 |
| 2.4 | 2 | 18.6 | 4 | 38.5 | 3 | 54.1 | 5 | 15.6 |
| 2.8 | H | — | — | — | 2 | 162 | 5 | 28.6 |

*Extracted
** Of Surfactant

When tested with crude oil and saline solutions as described in Example 3, the following results were obtained.

Slug No. 2521-A

With ACS crude, type (a) behavior was observed at 50,826 ppm NaCl.

With PNA crude, type (a) behavior was observed at 25,413 ppm NaCl and type (b) behavior was observed at 50,826 ppm.

With SLC crude, type (a) behavior was observed at 50,826 ppm NaCl.

Slug No. 2523

With ACS crude, type (a) behavior was observed at 25,413 ppm and type (b) was observed at 50,826.

With both PNA and SLC crudes, type (a) behavior was observed at both 25,413 and 50,826 ppm NaCl.

Slug No. 2526-A

With ACS crude, type (a) behavior was observed between 15,240 and 50,826 ppm NaCl.

With PNA crude, unsatisfactory phase behavior occurred at all concentrations (obviously the surfactant was unsatisfactory with this type of oil).

With SLC crude, type (b) behavior was observed between 15,240 and 50,826 ppm.

EXAMPLE 5

The experiment of Example 3 was repeated in all essential details except that slugs containing AL-KATERGE-E and -T were formulated with No. 2 diesel fuel. The Alkaterge was first dissolved in the diesel fuel, then Petrostep 450 was blended in with thorough mixing. After this, the "produced" water was blended in.

The stabilities and viscosities were as follows:

| Slug No. | 2532 | | 2533 | |
|---|---|---|---|---|
| Surfactant | Petrostep 450* | | Petrostep 450 | |
| Conc., g/100 g | 11.4 | | 11.4 | |
| Wt. % Active | 7.0 | | 7.0 | |
| Water, g/100 g | 85.6 | | 85.6 | |
| Diesel fuel, g/100 g | 3.0 | | 3.0 | |
| Oxazoline Type | E | | T | |
| Oxazoline, g/100 g | Stab. | Visc. | Stab. | Visc. |
| 0.0 | 5 | 2.5 | 5 | 2.5 |
| 0.4 | 5 | 4.0 | 5 | 4.0 |
| 0.8 | 5 | 7.5 | 4 | 6.0 |
| 1.2 | 5 | 19.5 | 4 | 10.0 |
| 1.6 | 5 | 53.5 | 4 | 16.5 |
| 2.0 | 5 | 545 | 4 | 23.0 |
| 2.4 | 2 | 1620 | 4 | 29.5 |
| 2.8 | — | — | 4 | 35.0 |

When tested with crude oil and saline solutions as described in Example 3, the following results were obtained.

Slug No. 2532

With ACS and SLC crude, type (b) behavior was observed at saline concentrations between 10,165 and 50,826 ppm.

With PNA crude oil, type (a) behavior was observed between 10,165 and 50,826 ppm.

Slug No. 2533

With ACS crude, type (b) behavior was observed at saline concentrations between 10,165 and 50,826 ppm.

With PNA crude, type (a) behavior was observed at saline concentrations between 10,165 and 50,826 ppm.

With SLC crude, type (a) behavior was observed at 10,165 and 15,140 ppm and type (b) behavior was observed at 25,413 and 50,826 ppm.

We claim:

1. In the process for recovering crude oil from a geological formation containing it using a micellar solution comprising a hydrocarbon, water, a petroleum sulfonate surfactant having an equivalent weight of about 350–500 and a co-surfactant, the improvement comprising using as the co-surfactant or portion thereof from 0.4 to 2.4% by weight of a substituted oxazoline represented by the formula

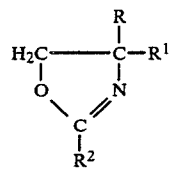

where R is ethyl or hydroxymethyl, $R^1$ is hydroxymethyl and the moiety $R^2$—C derives from oleic acid.

2. The process of claim 1 wherein R is ethyl.

3. The process of claim 1 wherein F is hydroxymethyl.

4. The process of claim 1 wherein the petroleum sulfonate is of equivalent weight of about 390–460.

5. A micellar solution comprising a hydrocarbon water, a salt of a low-equivalent weight petroleum sulfonate surfactant having an equivalent weight of about 350–500, from 0.4 to 2.4% by weight of a substituted oxazoline, and saline water wherein the oxazoline is represented by the formula

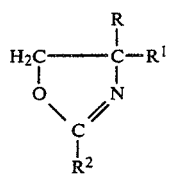

where R is ethyl or hydroxymethyl, $R^1$ is hydroxymethyl and the moiety $R^2$—C derives from oleic acid.

6. The micellar solution of claim 5 wherein the petroleum sulfonate is present in an amount of about 7 to about 14%, the oxazoline is present in an amount of about 0.4 to about 2.4% by weight and the saline water is an aqueous solution of about 600–700 ppm sodium chloride.

7. The solution of claim 6 containing about 2% of diesel fuel hydrocarbon.

* * * * *